April 21, 1970     E. A. SOUZA     3,507,414
ARTICLE MANIPULATING APPARATUS

Filed Dec. 1, 1967     3 Sheets-Sheet 1

EDWARD A. SOUZA
INVENTOR

*Huebner & Worrel*
ATTORNEYS

April 21, 1970  E. A. SOUZA  3,507,414
ARTICLE MANIPULATING APPARATUS
Filed Dec. 1, 1967  3 Sheets-Sheet 3

EDWARD A. SOUZA
INVENTOR

Huebner & Worrel
ATTORNEYS

United States Patent Office 3,507,414
Patented Apr. 21, 1970

3,507,414
ARTICLE MANIPULATING APPARATUS
Edward A. Souza, 3050 W. Swift Ave.,
Fresno, Calif. 93705
Filed Dec. 1, 1967, Ser. No. 687,208
Int. Cl. B60p 3/00; B60r 9/08
U.S. Cl. 214—450                              4 Claims

ABSTRACT OF THE DISCLOSURE

The present invention resides generally in mechanism for moving an object to transfer it from a first position to a second position, and more specifically to a device for facilitating loading a boat on the top of a vehicle and unloading a boat therefrom to a position readily susceptible for subsequent movement of the boat into an operating environment.

---

The invention is particularly susceptible of use as a boat loader and unloader, which in use transversely loads or unloads a boat with respect to the top of an automotive vehicle.

As is well known, boating in general is becoming increasingly of more interest. One deterring factor to private ownership and use of boats, particularly small boats adapted for hand or outboard motor propulsion, is the inconvenience and difficulty of handling a boat and of transporting the boat from the home of an owner or a storage facility to a body of water where the boat is to be used.

Prior to the present invention, boat owners have for the most part utilized boat trailers, attachable to the rear end of an automotive vehicle, on which a boat is mounted for such transportation. Many people, however, find a boat trailer undesirable because of space requirements, and also hauling a trailer can be undesirable and even dangerous. Boat trailers are also costly and many times inconvenient from the standpoint of loading a boat thereon, or unloading a boat at a place of desired usage.

In view of these undesirable features of boat trailers, some boat owners utilize carriers mounted on the top of automobiles. Such carriers, however, present substantial difficulites in moving a boat from the ground and mounting it on such an auto top carrier, and in some instances this has been accomplished solely by manual labor. When manual labor is the only method for so-positioning a boat, it not only is a physical strain for boat owners but additionally limits the size and weight of a boat which can be handled. In an attempt to at least partially obviate these difficulties and drawbacks there have been devices in the nature of, for example, adjustable height poles adapted for coaction with one end of a boat elevated that end from the ground, and requiring subsequent manual lifting and positioning of the boat from the front or rear end of a vehicle.

It is a primary object of the present invention to provide a boat loading and unloading mechanism, adapted for attachment to an automotive vehicle, and usable to move a boat transversely from in proximity to the ground adjacent to the side of the vehicle for subsequent sidewise movement for positioning on the top of the vehicle and vice-versa.

Another object is to provide such a boat loader and unloader susceptible of use by a single operatior, with a minimum amount of physical exertion involved, to so move or position a boat.

A further object is to provide a boat loading and unloading mechanism, the major components of which can be selectively and easily attached to or removed from a vehicle such as an automobile, so as to permit substantially unimpeded and normal use of the automobile when it is not desired to transport a boat thereon.

An additional object is to provide a boat loading and unloading mechanism susceptible of attachment to an automotive vehicle, and which in use is operable to move a boat from a position in proximity to the ground to an inverted transporting position on top of an automotive vehicle.

A still further object is to provide a boat loading and unloading mechanism which is of simple and inexpensive construction, and which is susceptible of rapid and easy use for loading a boat on top of an automobile or unloading it therefrom.

The present invention briefly includes a framework having a portion thereof removably attachable to an automotive vehicle, and including a car top carrying frame, and additionally a framework including a plurality of boat lifting arms and levers together with mechanism for moving the arms and levers from a boat unloaded position to a boat loaded position on top of an automotive vehicle, with the operating means being susceptible of easy and rapid operation by a single user.

Additional features, objects and advantages of the present invention will be more readily apparent from the accompanying drawings when taken together with the following description.

Figure 1:
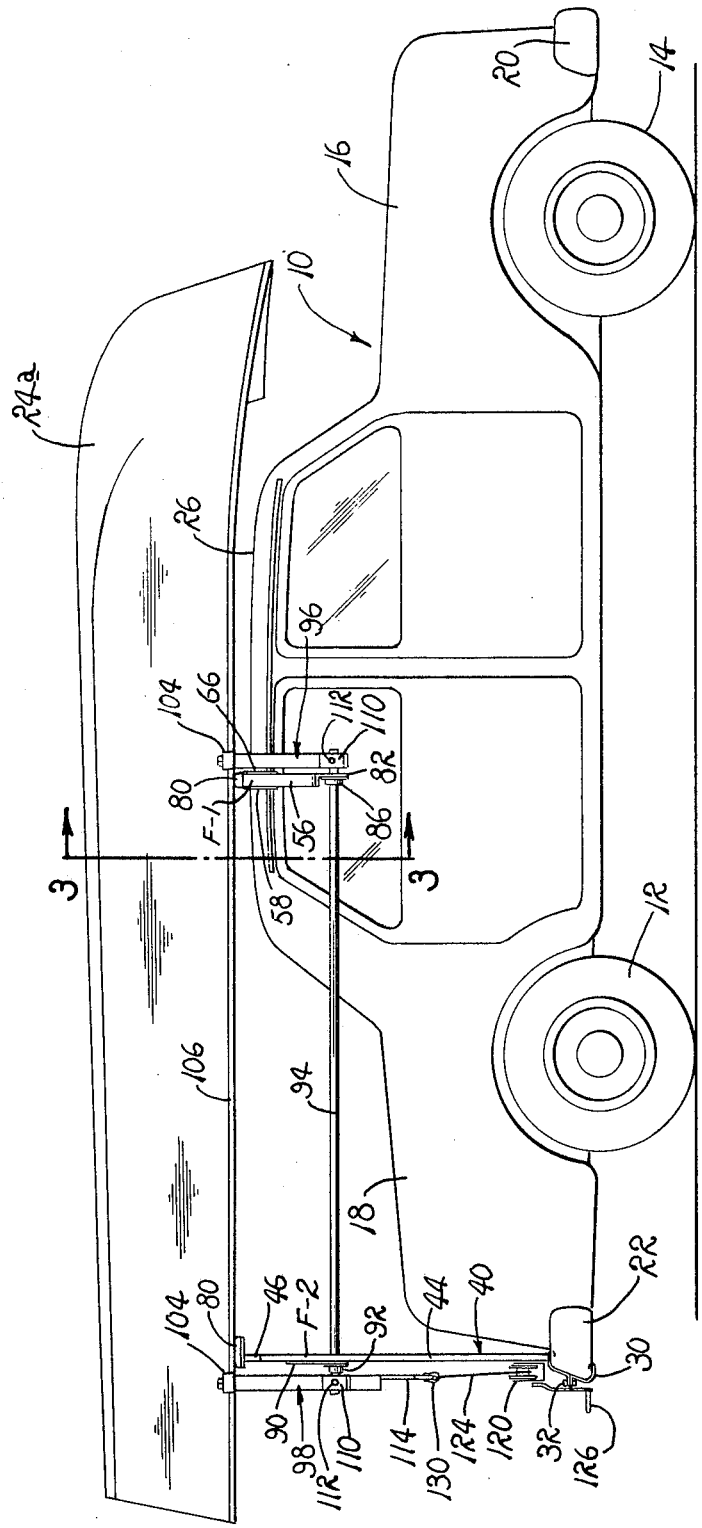
FIG. 1 is a side elevational view of an automotive vehicle with a boat mounted for transportation on the top thereof.

Referring now in more detail to the drawings there is shown a conventional automotive vehicle, generally designated 10, of a four-door body style having the usual rear wheels 12, front wheels 14, a hood 16, a rear deck 18, a front bumper 20 and a rear bumper 22. This style of vehicle has been chosen for illustrative purposes only as a setting for the present invention. The boat loading and unloading mechanism, which constitutes the subject matter of the invention, is equally usable with other styles and models of automotive vehicles that have hard tops, and can include two-door sedans, pickup trucks and the like.

In FIG. 1 a boat 24 is shown in loaded or carrying position on top 26 of the vehicle 10. The boat, when loaded, is in an inverted position. The mechanism for carrying or supporting the boat 24 on and with respect to the car top 26 includes fore and aft stationarily positioned frames F–1 and F–2 respectively.

Figure 2:
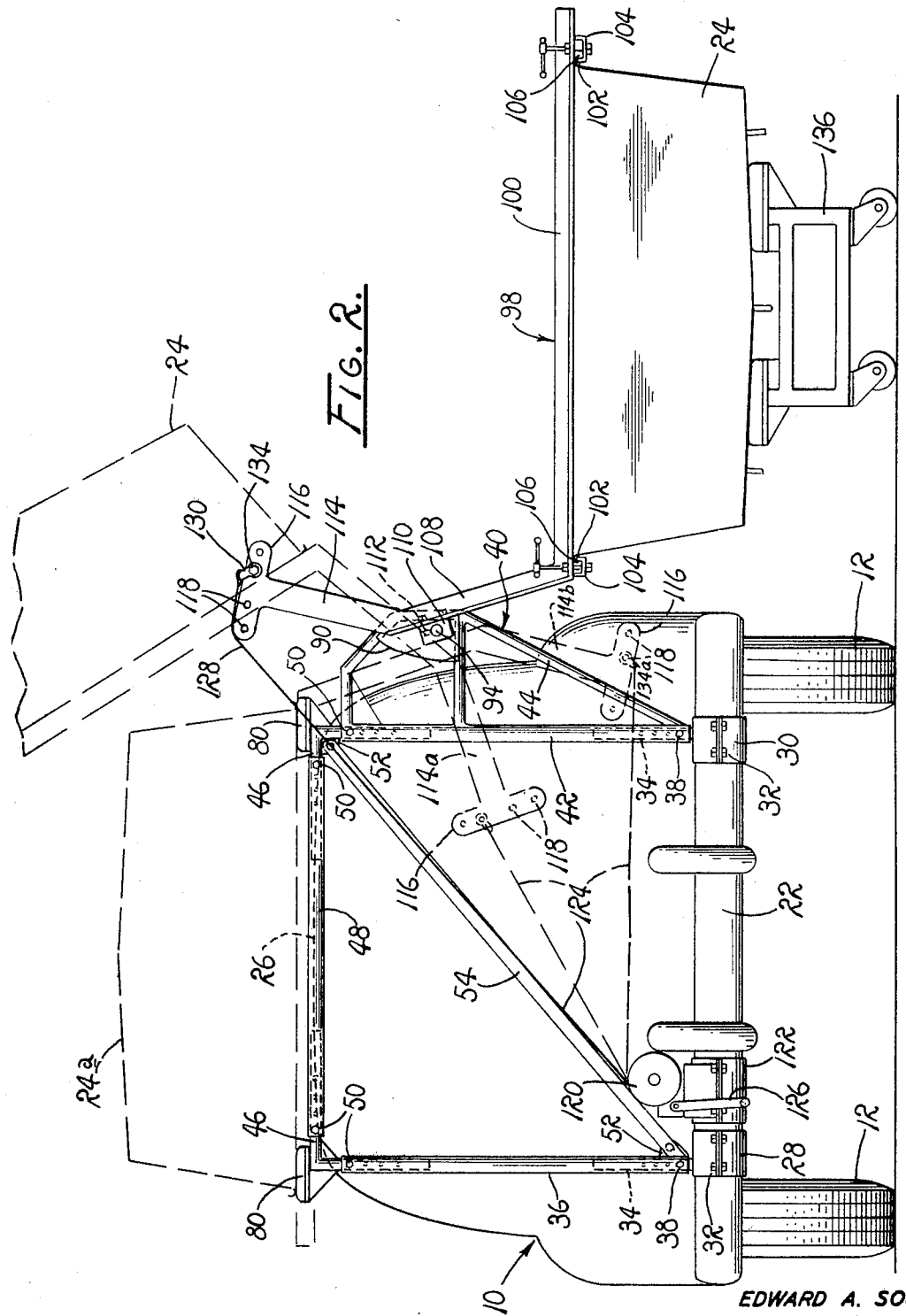
FIG. 2 is a rear elevational view of an automotive vehicle with portions of the boat loader and unloader, and a boat to be handled thereby shown in different positions of loading and unloading.

To support and mount rear frame F–2 split clamps 28 and 30 are detachably clamped in transversely spaced positions on rear bumper 22 by means of nuts and bolts generally indicated at 32. Vertically extending studs 34 are attached to brackets 28 and 30. On one side of the vehicle a hollow tube 36 is slidably mounted on a stud 34 and vertically adjustable by means of bolts or pins 38 insertable through coacting holes in the tube and stud. On the opposite side of the vehicle a frame 40 is provided including a hollow tube 42 slidably mounted on stud 34 in a manner similar to the tube 36. An outwardly extending frame portion 44 is attached to the tube 42. This frame 40 can be pivoted on the stud 34 from a retracted to an extended position for purposes to be hereinafter described. L-shaped rods 46 each have one leg thereof inserted in tubes 36 and 42, with the other legs thereof inwardly extending with respect to the center line of the vehicle. A hollow tube 48 removably interconnects the inwardly extending legs, and is secured thereto by means of bolts or pins 50. Ears 52 are attached to the frame F-2 by welding or the like, as shown in FIG. 2, between which a brace member 54 is attached to provide rigidity and strength to the frame. It will be noted that frame F-2 extends slightly above the car top 26, and is adapted to serve as a rear support for a boat when mounted in carrying position on the vehicle. The construction of this frame is such that it is readily detachable from the vehicle and susceptible of being disassembled into individual components for ease of handling and storage when a boat is not being transported.

Figure 3:
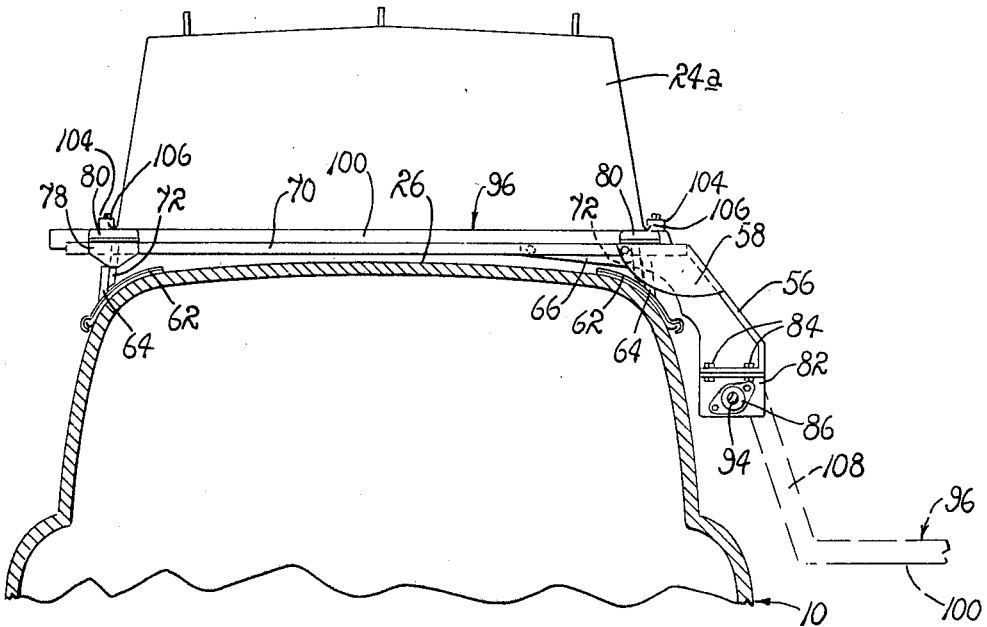
FIG. 3 is a fragmentary sectional view taken on line 3—3 of FIG. 1, showing a portion of the boat support frame and the loading and unloading mechanism of the present invention, and with a boat schematically shown in a fully mounted position on top of the vehicle.
Figure 4:
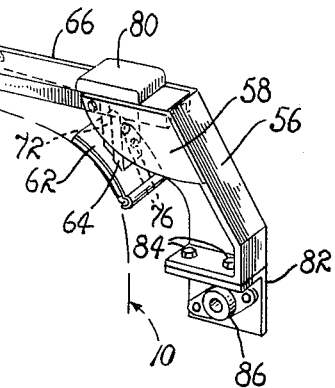
FIG. 4 is a perspective view of a portion of the boat support frame together with associated vehicle mounting means therefor.
Figure 5:
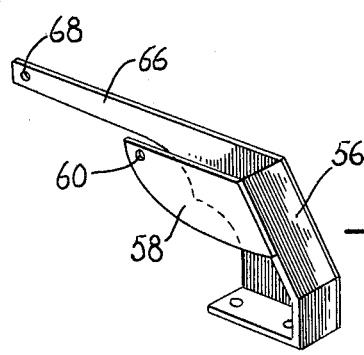
FIG. 5 is a perspective view of an end of the boat support frame.

The front frame F-1 includes an outside supporting member 56 preferably of angle shape, and generally of approximately a C-shaped configuration. A gusset 58 is secured to the supporting member 56 such as by welding. A plurality of openings or holes 60 are provided in the gusset to permit adjustability for mounting on different cars. Curvilinear shaped car top mounting brackets 62 are attached to the top 26 by coaction over the drain channels usually provided in automotive vehicles and are seated on the top of the vehicle. Upwardly extending fixed channels 64 are welded or otherwise secured to the brackets 62, and are provided with a plurality of holes therein. The outside supporting member 56 has an inwardly extending arm 66 with a hole 68 in proximity to its inner end. An elongated channel member 70 extends between the mounting brackets 62 over the car top. Downwardly depending channels 72 are secured to the channel member 70 and provided with holes 74 through which bolts can be inserted for coaction with the holes in the fixed channels 64 for removably mounting the channel in boat carrying position on the car. The channel member 70 is also secured to the outside support member 56 by means of a bolt 76 inserted through the hole 68 and a mating hole in the channel member 70. A bracing gusset 78 is provided interconnecting an end of the channel member 70 and the depending channel 72. Boat support pads 80 are attached to the upper side of the channel member 70 at opposite sides of the car top, and adapted for supporting engagement with the outer frame of a boat mounted on the car top in inverted position, as shown for example in FIG. 3. The front and rear frames F-1 and F-2 constitute stationarily fixed boat supports.

Outside supporting member 56 has an L-shaped plate 82 secured to the lower end thereof by means of bolts 84. A bearing 86 is attached to plate 82 by means of bolts or the like. A gusset 90 is attached to frame portion 44, as by welding or the like, and mounts a bearing generally designated 92. A shaft 94 is rotatably journaled in the bearings at 88 and 92 with the ends thereof extending beyond the bearings. This shaft and its mounts are adapted to rotatably mount the boat loading and unloading structure. Front and rear boat loading arms generally designated 96 and 98, respectively, include outwardly extended channels or angles 100 adapted for contacting engagement with the upper edges 102 of the boat 24, as shown in FIG. 2. Securing attachments, generally designated 104, of any appropriate construction can be used to attach the members 100 to the boat by coaction with outwardly extending beads 106 or the like on the boat. An intermediate arm 108 is secured to each of the outwardly extended channels 100 as by welding. Blocks 110 are welded to the intermediate arms 108 and are adapted for insertion therein of the ends of the shaft 94. Setscrews 112 or the like are provided in the blocks for securing the ends of the shaft against rotation with respect to the blocks. An angularly offset lever arm 114 is attached to the free end of intermediate arm 108, and is provided at its outer end with a T-head 116 having a plurality of holes 118 therein. The arms 100, 108 and 114 are integrated into units and constitute the boat loading and unloading arms 96 and 98.

A winch 120 is mounted on bumper 22 by means of a removable clamp 122. Cable 124 passes around and is secured to the sheave of winch 120. A handle 126 is provided for operation of the winch in an usual manner. The end portion 128 of cable 124 passes over and is in contact with the outer surface of T-head 116. A U-bolt 130 adjustably secures the free end of the cable, in conjunction with bolt 134, in one of the holes 118 in the T-head 116. The multiple position attachment of the cable to the T-head is provided in order to facilitate movement of the boat loading arms, and boat attached therewith, through and beyond a dead-center position of the over-all loading and unloading mechanism.

OPERATION

When it is desired to load a boat on a car top to which the mechanism of the present invention is attached, the boat will normally be positioned on a wheeled dolly 136 of a conventional type, and the boat moved into a position alongside the car and parallel therewith. The loading and unloading arms 96 and 98 are then rotated to the position shown in full lines in FIG. 2 so that the arms 96 and 98 come to rest on top of the upright boat, and are secured to the boat by actuation of securing attachments 104. Rotation of the lever arm system is effected by rotating shaft 94 which is fixed to the blocks 110 which in turn are welded to the loader arms, with the shaft rotating in bearings 88 and 92. The U-bolt is then attached in one of the openings in the T-head closest to the boat with respect to the center line of the arm 114. The handle 126 is then rotated in an appropriate direction whereupon it rotates arm 114 counterclockwise from the position shown in full lines in FIG. 2 downwardly to a position shown in dotted lines at 114a. At this position the center of gravity of the boat is approximately at the center line indicated in FIG. 2 which can be termed a dead-center position. The positioning of attachment of the cable to arm 114, however, permits movement of the boat over and beyond the dead-center position, so that gravity then tends to further rotate the boat and the lever system downwardly toward the car top for ultimate positioning on the support and carrying frames thereon. From the dead-center position, as the boat and lever system rotates further in a counterclockwise direction, the arm 114 will rotate to the position indicated at 114b. In order to permit this further rotation the winch must be so-operated as to permit extension of the cable. With the arm 114 in the position indicated at 114b the boat 24 will be positioned as indicated at 24a in FIG. 2 with the edges thereof resting on the pads 80. Any appropriate means can be used if desired to lash the boat in the so-mounted position.

When it is desired to unload a boat, the U-bolt 130 is attached in a hole on the opposite side of the center line of the arm 114 from that used to load a boat, as indicated at 134a, and in this position it permits rotation of the arm 114 and the boat loading arms 96 and 98 past the dead-center position, so as to permit swinging the boat out into the demounting position, as shown in full lines in FIG. 2.

The winch is provided with a locking ratchet mechanism to permit locking thereof in any position of movement of the winch and to prevent a free wheeling thereof which might otherwise be caused by weight of the boat and the position of the arms 96 and 98.

As pointed out previously, the frame 40 is pivotally mounted. When the boat loading and unloading mechanism is not in use, the arms 96 and 98, and shaft 94 can be readily removed from the vehicle and then the frame 40 can be rotated so that it does not extend beyond the side of the vehicle where it might otherwise interfere with normal operation.

Having described my invention, what I claim as new and desire to secure by Letters Patents is:

1. In a car top loader and unloader for loading a boat from the side of a car transversely onto the top thereof, a rigid boat supporting and carrying frame secured to a car with portions extending above the top thereof, a shaft rotatably mounted on said frame and extending along the side of the car, rigid boat loading and unloading arms secured to said shaft in spaced transversely outwardly extending relationship thereon, said arms including angularly offset portions with an outer boat securing portion thereof being substantially parallel to ground level when in lowered boat securing position prior to raising the boat, the other angularly offset portion being fixed to the shaft and at a sharp upward angle from ground level, means for securing said means to the top of a boat in upright position when placed along side the car, means for rotating said shaft and arms secured thereto to raise a boat onto the car top transversely of the car while rotating the boat to an inverted position and to lower the boat onto the said frame in an inverted position including an angularly offset lever arm attached to a free end of an arm portion fixed to said shaft, said lever arm having a T-shaped head at the outer end thereof and a plurality of spaced openings therein, a winch attached to the car in spaced relation from said lever arm, a cable operatively interconnecting said winch and a selected one of said holes in said T-head, said winch upon rotation imparting an angular rotary movement to said lever arm through the medium of said cable to thereby rotate said shaft and said arms, for rotating said arms from a lowered to a raised position, securing of said cable in an opening on the opposite sides of the center line of said lever from said winch permitting rotation of the arms and boat in either direction through and beyond a rotated dead-center position with respect to the center of gravity of said boat.

2. In a car top loader and unloader for loading a boat from the side of a car transversely onto the top thereof, a rigid boat supporting and carrying frame adapted to be secured to a car with portions extending above the top thereof and including a front frame member supported on and extending transversely over the top of the car and a rear frame comprising a rectangularly shaped open work of rigid members being detachably mounted on the rear bumper of the car, the individual members of the open work frame being detachable from one another and a pivotally mounted end portion, said end portion being rotatable to an extended position with the free end thereof positioned beyond the sides of the car and providing means for a shaft bearing support and being retractable to a non-extended position for unimpeded car usage, a shaft rotatably mounted in said support and extending along the side of the car, rigid boat loading and unloading arms secured to said shaft in spaced transversely outwardly extending relationship thereon, means for securing said arms to the top of a boat in upright position when placed along side the car, and means for rotating said shaft and arms secured thereto to raise the boat onto the car top transversely of the car while rotating the boat to an inverted position, and to lower the boat onto said frame in the inverted position.

3. In a car top loader and unloader as claimed in claim 2, said front frame having a generally C-shaped depending extension at one end thereof, and a shaft bearing block attached in proximity to the lower end thereof.

4. In a car top loader and unloader as claimed in claim 3, the upper surfaces of said front and rear frames extending above the car top, boat rest cushion pads attached to the upper surfaces of said frames, a boat when in inverted loaded position resting on said pads with the loading and unloading arms being spaced above the car top.

References Cited
UNITED STATES PATENTS

| 2,715,974 | 8/1955 | Van Nest | 213—450 |
| 2,896,804 | 7/1959 | Ingram | 214—450 |
| 3,058,607 | 10/1962 | Kiley | 214—450 |
| 3,141,565 | 7/1964 | Cain | 214—450 |
| 3,357,578 | 12/1967 | Koenig | 214—450 |

HUGO O. SCHULZ, Primary Examiner

U.S. Cl. X.R.
224—42.1